TELEPHONE ALARM DEVICE WITH SELECTIVE AUTOMATIC DIALING OF A PLURALITY OF STATIONS

Filed Sept. 14, 1964 3 Sheets-Sheet 1

INVENTOR.
G. A. Oppenheimer
BY
[signature]
ATTORNEY

INVENTOR.
G. A. Oppenheimer
BY
[signature]
ATTORNEY

INVENTOR.
G. A. Oppenheimer
BY
[signature]
ATTORNEY 3,360,607

TELEPHONE ALARM DEVICE WITH SELECTIVE AUTOMATIC DIALING OF A PLURALITY OF STATIONS

Gene A. Oppenheimer, Rock Island, Ill., assignor to Sensatronics, Inc., Davenport, Iowa, a corporation of Iowa Filed Sept. 14, 1964, Ser. No. 396,282
5 Claims. (Cl. 179—5)

ABSTRACT OF THE DISCLOSURE

A telephone-actuated alarm system is shown incorporating multiple calling circuits enabling the selective transmission of signals to a plurality of receiving stations. Automatic dialing is accomplished by a hookswitch pulser positioned atop the hookswitch buttons in the handset cradle. The pulser is energized via a switch which is actuated by a plurality of selectable endless chains with links corresponding to dial pulses.

The invention has for its principal object the provision of an improved system that may be associated with a telephone and telephone system without any modifications or alterations in either the telephone or its system. Other objects reside in the provision of a simplified apparatus, one that may be tied in with existing alarms, and one that will permit the use of the telephone in its conventional manner even though the telephone is incorporated with the alarm or signal apparatus.

Broadly speaking, systems of the general character are known and rely upon some means for sensing an undesirable situation; e.g. fire, burglary etc. and actuating a mechanism for dialing a predetermined number on the telephone, thereby utilizing the central telephone system to complete the call. In order to inform the answering party of the location of the sensed situation, such devices ordinarily employ a pre-recorded message.

Principal disadvantages in known apparatuses or systems are complications in the electrical hook-up, cumbersome dialing mechanisms and inability to enable the use of the telephone in a normal manner. According to the present invention, these disadvantages are eliminated and an improved low-cost apparatus is provided, possessing the above objects as well as others that will become apparent as a preferred embodiment of the invention is disclosed, by way of example, in the ensuing description and accompanying sheets of drawings, the several figures of which are described below.

Figure 1:
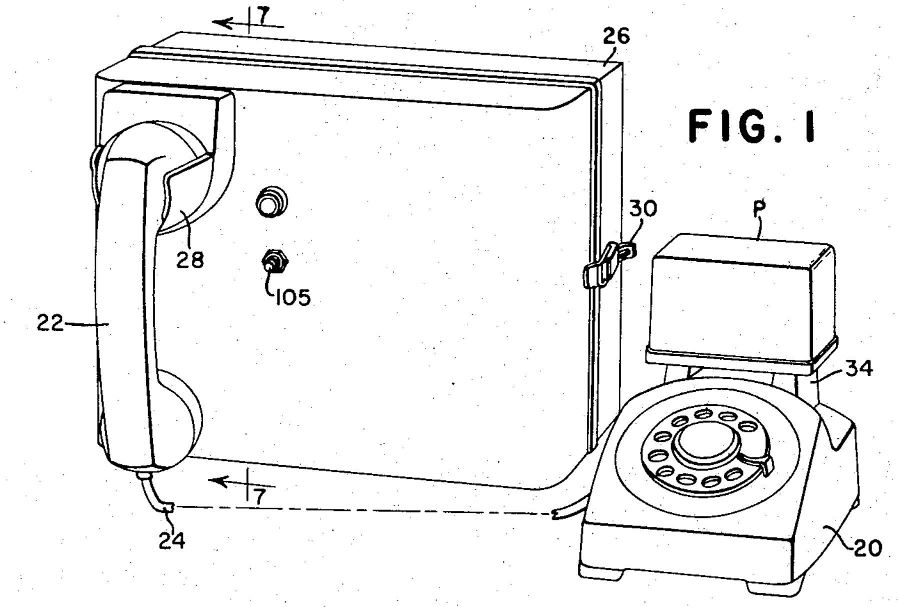
FIGURE 1 is a perspective showing the relationship of the main casing of the apparatus with a typical dial telephone.

Reference will be had first to FIGURE 1 for an overall explanation of the apparatus or system. In that figure, a typical dial telephone will be recognized at 20 and its receiver at 22, the latter being connected to the base part of the telephone by the conventional receiver cord 24. The improved system is contained primarily in a casing 26 which affords the basic support for internal components, to be described later. The letter P represents a pulser device which is supported on the telephone base in lieu of the hand-set or receiver 22. This receiver is normally hung up on a bracket 28 on an external portion of the cover of the casing 26. An easily releasable latch 30 normally maintains the cover in closed position, the opposite edge thereof being hinged to the basic part of the casing as is suggested at 32 in FIGURE 6.

Figures 3, 4, 5:
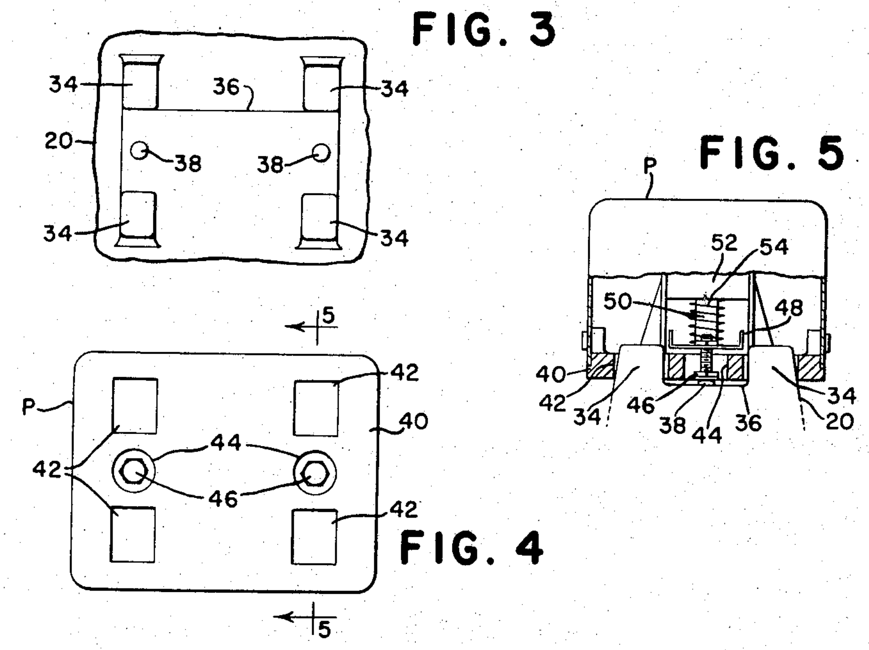
FIGURE 3 is a fragmentary view, on an enlarged scale as respects FIGURE 1, of the upper portion of the telephone, showing the relationship of the means for normally carrying the telephone receiver.
FIGURE 4 is a bottom plan view of the pulser unit utilized for effecting "dialing" of the telephone.
FIGURE 5 is a section taken generally along the line 5—5 but with the pulser installed on the portion of the telephone shown in FIGURE 3.

FIGURES 3 and 5 show that the upper portion of the base of the telephone is typically provided with a plurality (here four) of upstanding lugs 34, grouped to afford what may be regarded as a channel 36 upwardly through which project a pair of buttons or contacts 38, these being the usual buttons depressed on a conventional telephone when the hand-set or receiver 22 is in place.

The pulser is in the nature of a box-like structure having a removable bottom 40 provided with a plurality of rectangular apertures 42, which respectively receive the upstanding lugs 34 on the telephone, and a pair of circular apertures 44 through which project a pair of downwardly extending depressors 46. Interiorly of the pulser box, the depressors are yoked together by a transverse member 48 which in turn is secured to the lower end of a plunger 50 that depends from or forms part of a relay or solenoid 52. When electrically deenergized, the plunger is expelled downwardly by a compression spring 54. Conversely, when energized, the relay 52 draws the plunger upwardly. When the solenoid is deenergized, the depressors 46 act to hold down the telephone contact buttons 38 just as if the receiver or hand-set 22 were in place. Likewise, when the solenoid is energized, the depressors are drawn upwardly and the spring-loaded buttons 38 rise, just as they do when the receiver is removed from the telephone base.

From the description thus far, it will be seen that absolutely no alteration has been made in the telephone. The receiver 22 is removed and the pulser P is simply used in its stead. The pulser bottom openings 42 adapt themselves to the upstanding lugs 34 on the telephone to properly locate the pulser so that the depressors 46 are directly respectively over the receiver contact buttons 38. In the absence of electrical energization, the depressors hold the buttons 38 downwardly, since the spring 54 is of course stronger than the conventional springs that bias the buttons 38 upwardly. Thus, all that is involved so far as concerns the "installation" of the casing 26 relative to the telephone is simply to place the casing in proximity to the telephone so that the pulser may be substituted for the receiver and further so that the receiver may be hung up on the casing receiver support bracket 28. The distance between the telephone and the casing will be determined by the length of the cord 24 between the receiver and the telephone and the length of the cable between the pulser P and the casing 26. These of course are variables and need not be elaborated. The electrical connection between the pulser P and the internal components of the casing will be described in connection with the description of the wiring diagram of FIGURE 2.

Figure 2:
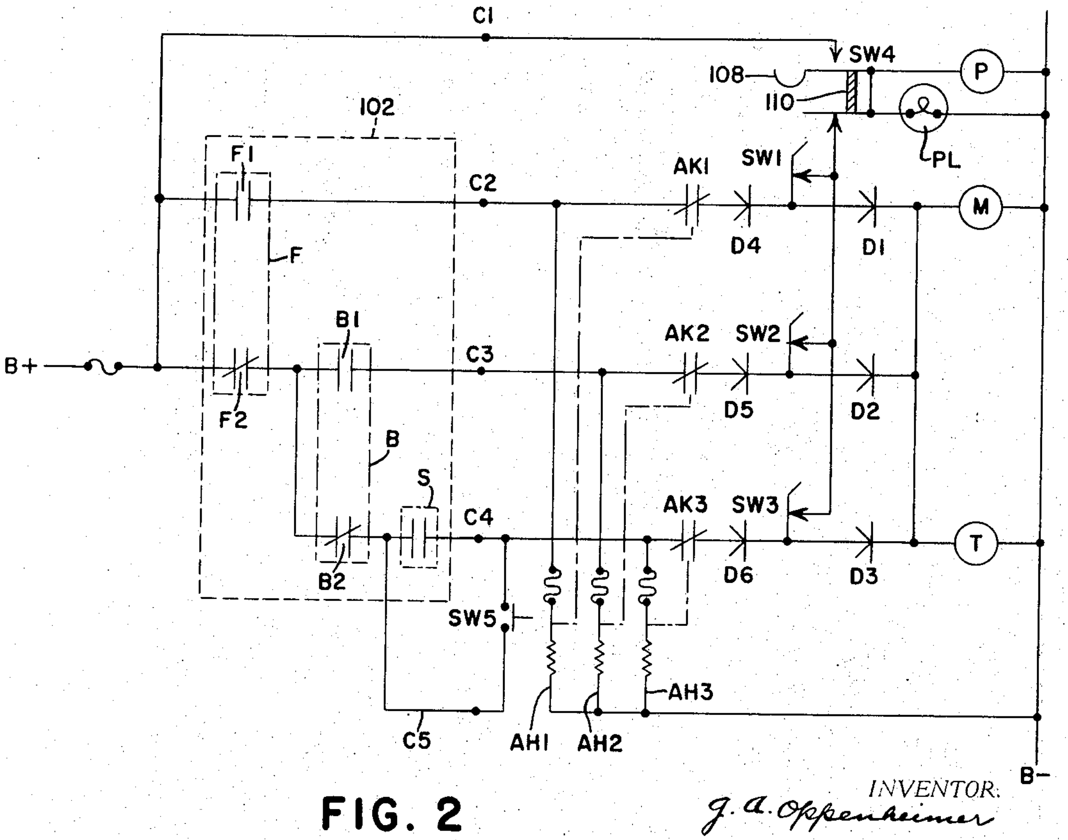
FIGURE 2 is a wiring diagram illustrating the basic components of the electrical system.
Figure 6:
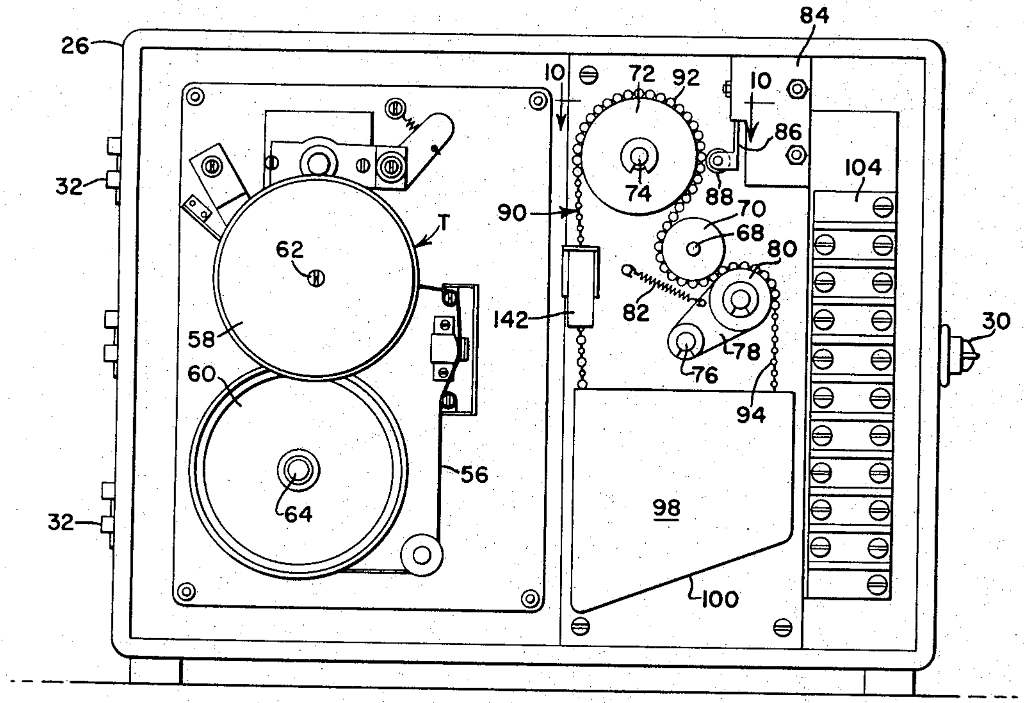
FIGURE 6 is an enlarged view, with respect to FIGURE 1, showing the casing with its cover removed so as to expose the interior mechanism.
Figure 7:
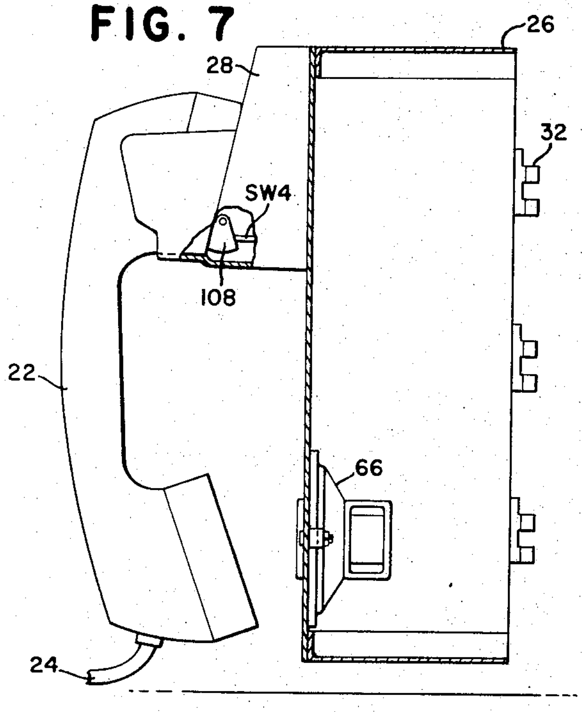
FIGURE 7 is a section, drawn to an enlarged scale, as seen generally along the line 7—7 of FIGURE 1.

Reference will now be had primarily to FIGURES 6 and 7. The casing 26 carries internally thereof a tape record T, which may be of any conventional construction. The purpose of this mechanism is to carry a pre-recorded message, such as would include the location of the building in which the system is used, plus an identification of the system so as to properly apprise the person answering the called telephone. So far as the broad principles of the invention are concerned, the tape record could be any other message-bearing medium and thus the details are unimportant. The particular type of mechanism illustrated has a tape 56 carried by upper and lower spools 58 and 60 which in turn are carried respectively on shafts 62 and 64, one of which may be suitably connected to an electric motor M (FIGURE 2). The type of mechanical connection is not material.

The cover of the casing 26 is appropriately provided with a transmitter or loud speaker 66, so located that when the receiver 22 is hung up in place as shown in that figure, the loud speaker 66 is alined with the mouthpiece of the receiver. Here again, the details could be varied and therefore the relationship is shown only generally. When the tape record is switched on, by means to be described subsequently, the message thereon is transmitted by the loud speaker to the receiver and therefore is transmitted by the regular telephone system to the called number.

The casing 26 carries internally thereof a motor-driven shaft 68, which may be connected to the motor M, and which carries thereon a plurality (here three) of driven sheaves 70, only one of which is shown but the presence of the three of which will be clear from the presence of three idler sheaves 72 (FIGURE 10) journaled on a shaft 74 parallel to the motor shaft 68 and slightly thereabove.

Figure 10:
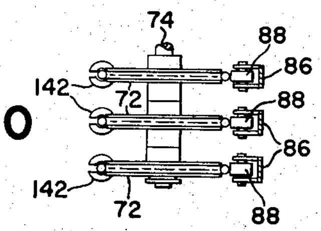
FIGURE 10 is a fragmentary plan view, partly in section, as seen along the line 10—10 of FIGURE 6.
Figure 9:
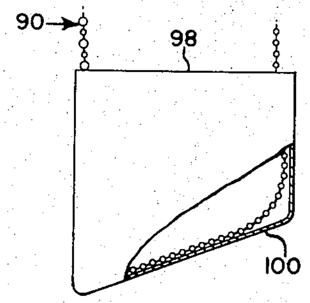
FIGURE 9 is a fragmentary view, partly in section and with portions broken away, illustrating the receptacle that receives the elongated endless flexible element carrying the pre-selected telephone number.

Just below the motor-driven shaft 68, there is a supporting shaft 76 which carries a plurality of arms (here three) 78. Each arm journals thereon a guide sheave 80 and each arm is spring-loaded at 82 toward its respective driven sheave 70. Although only one guide sheave 80 shows in the drawings, the presence of three thereof will be clear from the presence of the three large sheaves 72 (FIGURE 10).

As seen in FIGURE 6, the upper right hand corner portion of the casing 26 carries internally thereof supporting means 84 in which are located three conventional electrical switches SW1, SW2 and SW3 (FIGURE 2). Each of the switches is roller actuated and has an arm 86 which in turn carries a roller 88. The three rollers are respectively in the radial planes of the sheaves 72 (FIGURE 10).

Figure 8:
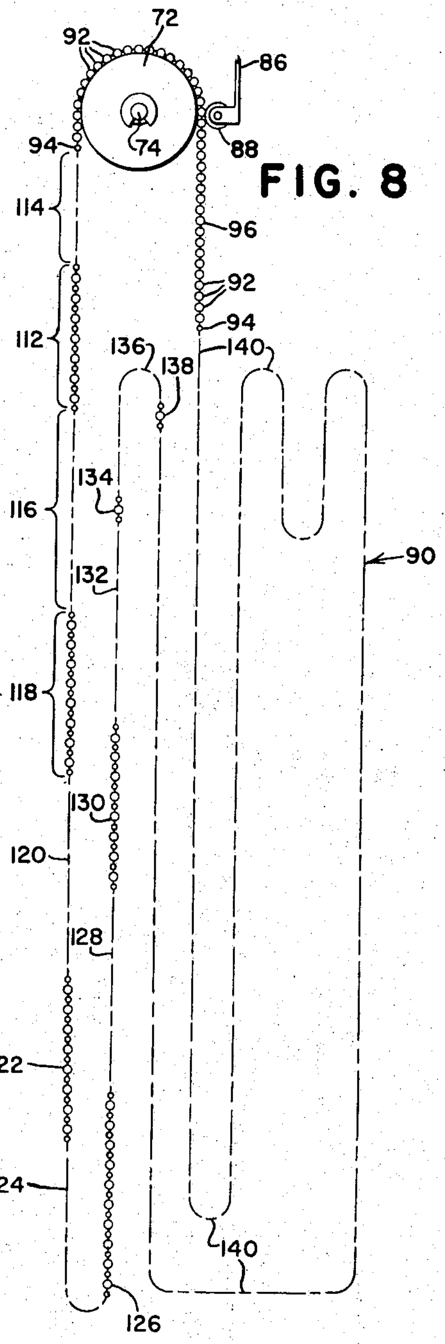
FIGURE 8 is a schematic illustration of the improved means for carrying the pre-selected telephone number.

The purpose of each set of sheaves 70–72–80 is to carry an endless flexible element 90 which in turn carries the preselected telephone number to be called in the event of an occurrence that trips or is sensed by the system. In the present case, the endless element 90 is a chain made up of alternate links and beads or balls, the balls being of two different sizes (large balls 92 and small balls 94) and intervening links 96. This chain is best shown in FIGURE 8. A typical construction will be found in key chains and the like, except for the difference, of course, in the sizes of the beads or balls 92 and 94.

FIGURE 8 shows, to scale, the proximate true length of the chain, and, comparing this with FIGURE 6, it will be seen that the length would be more than could be accommodated if the entire chain were suspended. Therefore, the lower portion of the casing carries a container or receptacle 98, open at its top and closed by four walls and a bottom 100 that slopes downwardly and to the left as seen in the drawings. The container accommodates the excess length of chain and the sloping floor contributes materially to keeping the chain in a disentangled condition so that it is readily carried over the associated set of sheaves 70–72–80, the sheaves being appropriately grooved (FIGURE 10) to accommodate the chain. The direction of travel of the chain is clockwise as seen in FIGURES 6 and 8. There are of course three chains in the present case; although, it will be clear that only one chain could be used or even more, depending upon the number of situations to which the system is responsive.

In the present instance, the three situations chosen for purposes of illustration are fire, burglary and a situation requiring supervisory control, such as the failure of the refrigeration system at a super market, for example. Since there are several types of sensory devices and since these are old broadly, only a general description thereof will be given here. In FIGURE 2, the large dotted rectangle 102 represents any such conventional system, equipped with three sensors F, B and S standing respectively for fire, burglary and supervisory. The fire sensor may be any of the well known thermal-responsive sensors. The burglary sensor may be any typical sensor such as is actuated by the opening of a door, window, etc. And the supervisory sensor S may be typically of the thermally-responsive types associated with freezers, refrigerators and the like. These sensors may or may not be grouped but at any rate are in the building remote, in most cases, from the casing 26-telephone 20 relationship, and are electrically connected into the main circuitry at terminals C1, C2, C3 and C4. The casing is provided with an appropriate internal terminal block 104 for accommodating these and other terminals. This is a detail subject to wide variation and is not material to the present case.

The electric circuit is preferably battery-energized so as to be independent of electrical failures. Opposite ends of the circuit are therefore shown as bearing the legends B-positive and B-minus. Of course any other appropriate source of electrical potential could be provided.

For purposes of simplification, the four circuits will be referred to on the basis of the identification of the terminals C1, C2, C3 and C4. These are connected to the motor M and pulse P in a manner to be presently described. If the tape record is driven by a separate motor, such motor will be built in and will be electrically connected to the circuit as illustrated. The switches SW1, SW2 and SW3 are respectively in circuits C2, C3 and C4. The fire sensor F includes a double throwh switch which is here shown as open at F1 in circuit C2 and closed at F2 in circuit C3. The burglary sensor also includes a double throw switch, open at B1 in circuit C3 and closed at B2 in circuit C4. A single throw switch is provided in the supervisory sensor S and is normally open as illustrated. A subsidiary circuit C5 is normally open by means of a push-to-test switch SW5, the button for which appears at 105 in FIGURE 1. Closing of switch SW5 will test the supervisory circuit C4 even though the supervisory sensor switch S is open. This will of course close the circuit to the motor, pulser and tape. Any other means of testing the system could be provided.

Internally of the receiver-supporting bracket 28 on the casing 26 is a spring-loaded switch actuator 108 for a double throw switch SW4, which controls the pulser P as well a hang-up indicator light PL. In the position of the switch SW4 in FIGURE 2, the two sides of which are mechanically connected as at 110 and electrically connected as shown, the pulser is disconnected from circuit C1 but is connected to one side of the switches SW1, SW2 and SW3. In other words, the pulser relay is not energized from circuit C1 but could be energized from closing of any one of the switches SW1, SW2 and SW3.

In circuit C2, between the fire sensor F and switch SW1 is a normally closed switch AK1. Similar switches AK2 and AK3 are provided respectively in circuits C3 and C4. Each of the switches AK1, AK2 and AK3 is time-controlled so as to limit the number of times that a number is called and the message transmitted. For example, switch AK1 is under control of a timer device AH1, and similar devices AH2 and AH3 are provided respectively for switches AK2 and AK3. The AH devices may be of any conventional type, as for example, that known to the trade as an "Amperite" relay, including a heater element and a voltage-dropping resistor, which will be clear without elaboration. The dot-dash line leading from control AH1 to switch AK1 represents the connection between the two. Similarly, the dot-dash lines between the other controls and other switches have the same representation. Solid state diodes are used at D1, D2, D3, D4, D5 and D6 to block out the possibility of dialing more than one number at the same time, since, according to the present disclosure, three different numbers could be called because there are three chains 90, each of which carries a different telephone number. For example, one chain will carry the number of the fire department, the other will carry the number of the police department and the third will carry the number of the person expected to exercise supervisory control when the supervisory sensor S is tripped or actuated.

For an understanding of the operation of the system, it should be recognized that the switches SW1, SW2 and SW3 would be normally closed so as to complete the circuit to the pulser P, meaning that the pulser relay 52 is energized and therefore releases the receiver contact buttons 38. However, the switches are so constructed relative to the respective chains that the switches are opened by the large beads 92 on the chain. This means that the pulser, then, would be deenergized and the spring 54 would cause the depressors to depress the receiver contact buttons, the same as if the receiver were hung up. Since the receiver 22 when hung up on the bracket 28 actuates the switch arm 108, the switch SW4 is open between the pulser and circuit C1. Even though the pulser circuit portion is closed between itself and the common side of the switches SW1, SW2 and SW3, these switches are all open because of the presence of a consecutive row of large beads 92 on the chain 90. Therefore, the telephone is ready for use, whether by the system or whether by an individual using the receiver 22 and the telephone dial in conventional manner. For example, if the person picks up the receiver 22 from the receiver-supporting bracket 28, switch SW4 will close to circuit C1, energizing the pulser relay so as to draw the plunger upwardly and release the receiver contact buttons 38. The person may then use the telephone dial to dial a number, just as he would were the telephone disassociated from the improved system. When the receiver is hung up again, the light PL will go out, indicating that the system is in order for automatic operation.

FIGURES 6 and 8 show the consecutive series of large beads 92 trained about the sheave 72 so as to move the switch arm 86 via its roller 88 to an open condition. This will also be true of the other two chains. For purposes of simplicity, reference will be had to one chain and to FIGURE 8 for an explanation of how the telephone number is embodied in the chain.

As noted at the upper portion of FIGURE 8, the consecutive series of large beads 92 is relatively long, representing "hang-up" time. The switch SW1 (chosen for purposes of explanation) is of course open. Proceeding to the left or counterclockwise of the consecutive series of large beads 92 is a group of beads identified in its entirety by the numeral 112, and intervening between the group 112 and the left hand end of the series of large beads 92 is a series of small beads 114. In the group 112 there are seven large beads, each pair of which is separated from its neighbor by a small bead. Therefore, as group 112 passes the roller 88, carried by the sheave 72, it will open and close switch SW1. The intervening group of small beads 114, leaving the switch SW1 closed, will cause the pulser relay to energize, giving the same result as were the receiver 22 removed from the channel 34 on the telephone base. During this interval, the dial tone will be "heard" followed by the passage of the bead group 112, which will "dial" the number. In the present case, there are seven large beads and these will pulse the pulser seven times, depressing and releasing the receiver contact buttons 38 at a rate of about eight to twelve pulses per second, depending upon the requirements of the local telephone system. This is based on the principle that the pulsing of the contact buttons at the proper rate will be the equivalent of dialing the same number on the telephone dial. Thus, the bead group 112 will "dial" the number seven. The bead group is followed by a next group of all small beads 116, representing an interval between bead group 112 and bead group 118, here made up of alternated large and small beads so as to "dial" the next number in the pre-selected telephone number. In this particular case, there are eight large beads in bead group 118.

Following bead group 118 is a group 120 of all small beads, succeeded by a bead group 122 of alternated large and small beads, the large beads here numbering eight, so that it will be seen that the first three digits of the pre-selected telephone number are seven-eight-eight. These groups are followed in succession by groups 124 (all small), 126 (ten large alternated with small beads), 128 (all small), 130 (large and small alternated), 132 (all small), 134 (one large), 136 (all small) and 138 (one large). From the single large-bead group 138 all the way to the lowermost right hand large bead of the continuous large-bead series is an elongated series 140 of small beads. This means that throughout the total length of the series 140 the switch SW1 will be closed so that the pulser is energized and the receiver contact buttons 38 will be in their up positions, the same as would be the case were the receiver removed and held while the user awaits an answer from the called telephone. For example, in a system in which the sheave 72 is on the order of, say, two inches in diameter, the chain 90 would be approximately seven feet in length. This incorporates the proper intervals between number digits; e.g., 114, 116, etc., as well as an appropriate length of the series of small beads 140 to accommodate ring time and answer time. Of course, as soon as the circuit is closed, the motor-driven tape operates to transmit the message. This will be repeated continuously until the called number answers and even, of course, after an answer is effected. Since the tape is endless, the repetition is not a disadvantage and in fact could be an advantage so that a person answering in the middle of a message could wait and hear the entire message.

During operation, the chain is appropriately guided by a chain guide 142, there being of course one guide for each chain, in this case three. As already described, the excess length of chain is readily accommodated by the container 98 as the chain loops back and forth in surprisingly good order.

By way of a specific example and looking now to FIGURE 2, wherein the normal condition of the fire sensor F is such that switch F1 is open in circuit C2 and switch F2 is closed in circuit C3. Should the fire sensor be actuated, in a manner known to those versed in the art, the switch F1 will close while opening switch F2. This will complete circuit C2 through closed switch AK1 to motor M, starting the mechanism in operation. As the chain is driven in a counterclockwise direction, the series of consecutive large beads 92 moves past the roller 88 of switch SW1, ultimately clearing out the "hang-up" time so that the pulser relay 52 becomes energized, in which condition it will remain during passage of the series 114 of all small beads. This represents "dial tone," followed by the digit series and intervening interval series 112, 116, 118, etc. Since the pre-selected telephone number is that of the fire department, that department will be "called" and "advised" of the situation at the location specified on the tape 56 of the tape record T.

The electrical system is so arranged that the fire sensor takes precedence over either of the other sensors B or S. This will be clear from the recognition that when the fire sensor is tripped or actuated the switch F1 will close circuit C2 but switch F2 will open circuit C3. Therefore, even though the burglary actuator be tripped or actuated to close circuit C3 at B1 and open circuits C4 at B2, circuit C3 will still not be energized because it is open when switch F2 is open. Conversely, should the burglary sensor be actuated first, closing switch B1 and opening switch B2, followed by the outbreak of a fire, fire sensor switches will take precedence over the burglary sensor, since opening of switch F2 while closing switch F1 will break circuit C3 while closing circuit C2.

Either sensor F or B will take precedence over the single-throw supervisory sensor S, since sensor S depends on closed switch B2 just as sensor B depends on closed switch F2, either of which will be opened respectively upon actuation of its sensor as it closes the other of the two sides of the switch; e.g. B1 or F1.

As previously stated, a main advantage of the system is that it may be used with a telephone without making any changes whatsoever in the telephone. This is exemplified particularly by the mounting of the pulser in place of the receiver and the hanging up of the receiver on the casing. Another feature of the invention is the ability of one to use the telephone in conventional manner even though it is mechanically tied in with the alarm or signal system. Further features reside in the ability to utilize a plurality of pre-selected telephone numbers and the benefits growing from the telephone number element (chain 90). Any preselected number may be readily incorporated in an element of this type merely by arranging the beads in proper fashion.

A still further benefit flows from the timed switches AK1 etc. The associated "Amperite" relay is set or may be selected on the basis of a two minute time, after which switch AK1 will open, breaking the circuit C2, in the example chosen. This enables the system to operate for, say, two minutes, in which time it should get the message across. Without the timer relationship, the system could tie up the line until manually shut off. The other relays AH2 and AH3 work the same way relative to switches AK2 and AK3, respectively.

As will be seen from FIGURE 1, the apparatus as considered enclosed in the casing 26 is small, compact, easy to transport and above all is easy to install, since only simple mechanical connections are involved; namely, replacing the receiver with the pulser and hanging the receiver on the casing support bracket.

Features and advantages other than those enumerated will readily occur to those versed in the art, as will many modifications and alterations in the preferred embodiment disclosed, all without departure from the spirit and scope of the invention.

What is claimed is:

1. An alarm and signal system for use with a telephone and telephone system, comprising: first, second and third calling means for actuating the telephone to call first, second and third telephone numbers, respectively; first, second and third electrical circuits respectively connected to and for operating the first, second and third calling means; first double-throw switch means normally opening the first circuit and closing the second circuit and changeable to the opposite condition; second double-throw switch means normally opening the second circuit between the first switch means and the second calling means and closing the third circuit and changeable to the opposite condition; third single-throw switch means normally opening the third circuit between the second switch means and the third calling means and changeable to close said third circuit; and first, second and third signal receivers respectively responsive to first, second and third conditions for respectively changing said first, second and third switch means.

2. An alarm and signal system for use with a telephone and telephone system, comprising: first and second calling means for actuating the telephone to call first and second telephone numbers, respectively; first and second electrical circuits respectively connected to and for operating the first and second calling means; first double-throw switch means normally opening the first circuit and closing the second circuit and changeable to the opposite condition; and second single-throw switch means normally opening the second circuit between the first switch means and the second calling means and changeable to close said second circuit; and first and second signal receivers respectively responsive to first and second conditions for respectively changing said first and second switch means.

3. An alarm system for use with a dial-system telephone having a base, a receiver and receiver-actuated contact means, comprising: a pulser device operative in lieu of the receiver to engage the contact means and electrically energizible and deenergizible to open and close said contact means; a support including switch means electrically connected to and openable and closable to energize and deenergize the pulser device; movable means carried by the support and including a plurality of switch operators arranged thereon in a predetermined pattern based on a selected telephone number and operative when moved past the switch means to open and close said switch means and thereby to cause the pulser device to pulse the contacts according to said pattern; drive means operatively connected to and for driving the movable means; means responsive to a predetermined signal for actuating the drive means and a second switch included in the means for supporting the receiver and electrically connected to the pulser device and normally opened by the supported receiver and closable upon removal of the receiver whereby to energize the pulser to close said contacts independently of the first-mentioned switch means.

4. An alarm system for use with a dial-system telephone having a base, a receiver and receiver-actuated contact means, comprising: a pulser device operative in lieu of the receiver to engage the contact means and electrically energizible and deenergizible to open and close said contact means; a support including switch means electrically connected to and openable and closable to energize and deenergize the pulser device; movable means carried by the support and including a plurality of switch operators arranged thereon in a predetermined pattern based on a selected telephone number and operative when moved past the switch means to open and close said switch means and thereby to cause the pulser device to pulse the contacts according to said pattern; drive means operatively connected to and for driving the movable means; means responsive to a predetermined signal for actuating the drive means and means on the support means for supporting the receiver; second switch means on the support means and electrically connected to the pulser device and normally opened by the supported receiver and closable upon removal of the receiver whereby to energize the pulser to close said contacts independently of the first-mentioned switch means.

5. An alarm system for use with a dial-system telephone having a base including four upstanding lugs grouped about a pair of upstanding buttons for receiver-actuatable contact means, and a receiver, a pulser device operative in lieu of the receiver to engage the contact means and electrically energizible and deenergizible to open and close said contact means, said pulser being supportable on the base and having a bottom including four apertures spaced according to and positively receivable of the lugs to locate and retain said device, and a movable member operative through said bottom to engage said buttons from above; a support including switch means electrically connected to and openable and closable to energize and deenergize the pulser device; movable means carried by the support and including a plurality of switch operators arranged thereon in a predetermined pattern based on a selected telephone number and operative when moved past the switch means to open and close said switch means and thereby to cause the pulser device to pulse the contacts according to said pattern; drive means operatively connected to and for driving the movable means; and means responsive to a predetermined signal for actuating the drive means.

References Cited

UNITED STATES PATENTS

| | | | |
|---|---|---|---|
| 2,866,850 | 12/1958 | Duca et al. | 179—5 |
| 3,124,650 | 3/1964 | Rostad | 179—5 |
| 3,166,641 | 1/1965 | Kreiner | 179—5 |
| 3,274,344 | 9/1966 | Young | 179—90.1 |

JOHN W. CALDWELL, *Primary Examiner.*

J. T. STRATMAN, *Assistant Examiner.*